US008057722B2

(12) United States Patent
Liang

(10) Patent No.: US 8,057,722 B2

(45) Date of Patent: Nov. 15, 2011

(54) METHOD FOR COUPLING A KEYBOARD BASE BOARD WITH A KEYBOARD BASE SEAT

(76) Inventor: Hui-Hu Liang, Changhua Hsien (TW)

( * ) Notice: Subject to any disclaimer, the term of this patent is extended or adjusted under 35 U.S.C. 154(b) by 84 days.

(21) Appl. No.: 12/397,471

(22) Filed: Mar. 4, 2009

(65) Prior Publication Data

US 2011/0094092 A1 Apr. 28, 2011

(30) Foreign Application Priority Data

Mar. 31, 2008 (CN) .......................... 2008 1 0085408

(51) Int. Cl.
*B29C 45/14* (2006.01)

(52) U.S. Cl. ........................................ 264/273; 264/260

(58) Field of Classification Search .................. 264/273, 264/260

See application file for complete search history.

(56) References Cited

U.S. PATENT DOCUMENTS 4,729,679 A * 3/1988 Hou .............................. 400/490
5,422,791 A * 6/1995 Bentz et al. ................... 361/823

* cited by examiner

*Primary Examiner* — Joseph Del Sole
*Assistant Examiner* — David N Brown, II
(74) *Attorney, Agent, or Firm* — Jackson IPG PLLC; Demian K. Jackson

(57) ABSTRACT

A method for coupling a keyboard base board with a keyboard base seat includes (a) a keyboard base board being formed with a plurality of through holes; (b) a mold being formed with a keyboard base board space and a keyboard base seat cavity corresponding to a keyboard base seat; (c) the keyboard base board being placed on the mold, and the mold being closed for injection molding; (d) a plastic material being poured from a concave trough through the through hole into the keyboard base seat cavity, the through hole of the keyboard base board and the keyboard base seat cavity being filled up with the plastic material; and (e) the mold being opened to take out the keyboard base board integrated with the keyboard base seat after cooling. The keyboard base board is formed integrally with the keyboard base seat for saving the working procedure.

2 Claims, 4 Drawing Sheets

METHOD FOR COUPLING A KEYBOARD BASE BOARD WITH A KEYBOARD BASE SEAT

BACKGROUND OF THE INVENTION

1. Field of the Invention

The present invention relates to a method for coupling a keyboard base board with a keyboard base seat, and more particularly to a method for coupling the keyboard base board with the keyboard base seat direct.

2. Description of the Prior Art

Electronic products are to be changed with each passing day, in particular to computers. A keyboard is used as an input apparatus to a computer. There are different keyboards on the market. As shown in FIG. 1, a conventional keyboard structure comprises a base board A having a through hole, a keyboard base seat B coupled to the base board A, a support C engaged with the keyboard base seat B, a key unit D disposed on the support D. The keyboard base seat B is formed by injection molding singly, and then placed on the keyboard base board A for fusion one by one. This assembly method is complicated and needs a lot of time, increasing the cost. In order to reduce the assembly procedure and lower the cost, the inventor of the present invention has devoted himself based on his many years of practical experiences to the development of a method for coupling a keyboard base board with a keyboard base seat.

SUMMARY OF THE INVENTION

The primary objective of the present invention is to provide a method for coupling a keyboard base board with a keyboard base seat direct. The keyboard base board is placed into a mold for injection molding so that the keyboard base board is coupled with the keyboard base seat direct.

According to a first aspect of the present invention, there is provided a method for coupling a keyboard base board with a keyboard base seat, comprising:

(a) a keyboard base board being formed with a plurality of through holes;

(b) a mold being formed with a keyboard base board space and a keyboard base seat cavity corresponding to a keyboard base seat;

(c) the keyboard base board being placed on the mold, and the mold being closed for injection molding;

(d) a plastic material being poured from a concave trough through the through hole into the keyboard base seat cavity, the through hole of the keyboard base board and the keyboard base seat cavity being filled up with the plastic material; and (e) the mold being opened to take out the keyboard base board integrated with the keyboard base seat after cooling.

According to a second aspect of the present invention, there is provided a method for coupling a keyboard base board with a keyboard base seat, comprising:

(a) a keyboard base board being formed with a plurality of through holes each having a stepped hole;

(b) a mold being formed with a keyboard base board space and a keyboard base seat cavity corresponding to a keyboard base seat;

(c) the keyboard base board being placed on the mold, and the mold being closed for injection molding;

(d) a plastic material being poured through the through hole into the keyboard base seat cavity, the through hole and the stepped hole of the keyboard base board and the keyboard base seat cavity being filled up with the plastic material; and (e) the mold being opened to take out the keyboard base board integrated with the keyboard base seat after cooling.

Compared to the prior art, the present invention has the following advantages: the keyboard base board is coupled with the keyboard base seat direct for decreasing the assembly working hour; the facilities, plastic materials, manufacturing conditions, temperature of the present invention are similar to the those of the prior art except the mold of injection molding. When the keyboard base board is placed into mold, the mold is able to make the keyboard base board integrated with the keyboard base seat.

DETAILED DESCRIPTION OF THE PREFERRED EMBODIMENTS

Figure 1:
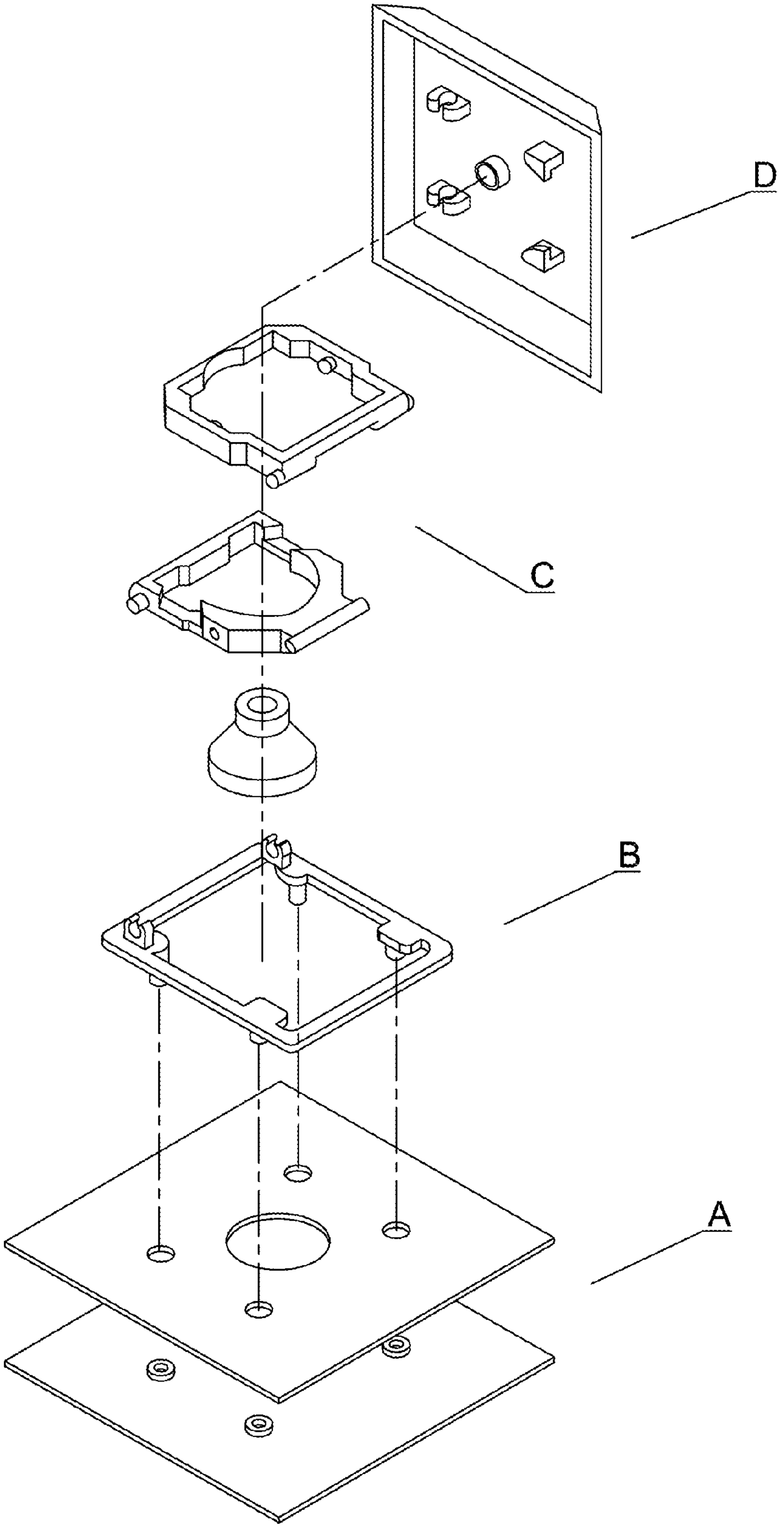
Fig. 1 (PRIOR ART)
FIG. 1 is an exploded view of a conventional keyboard assembly.
Figure 2:
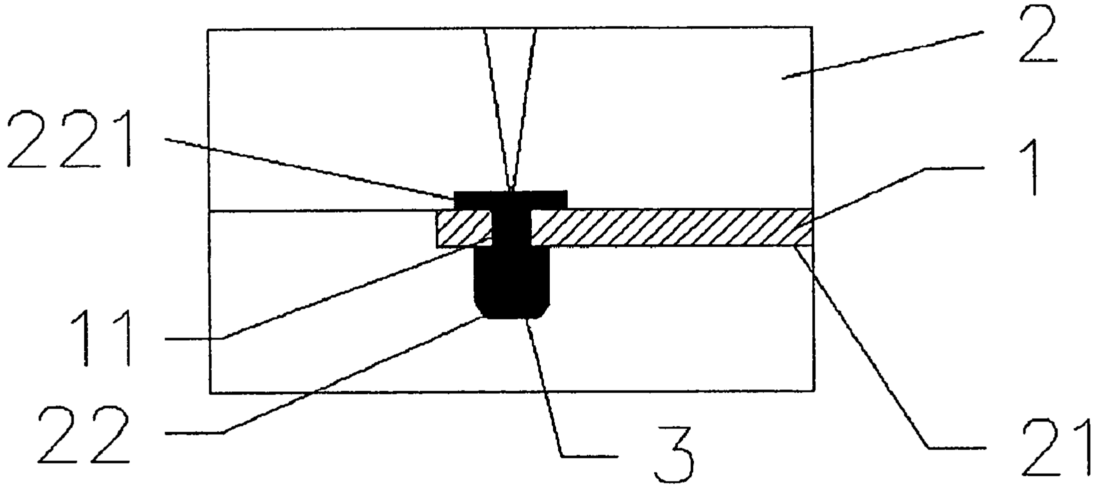
FIG. 2 is a schematic view of a mold according to a first embodiment of the present invention.
Figure 4:
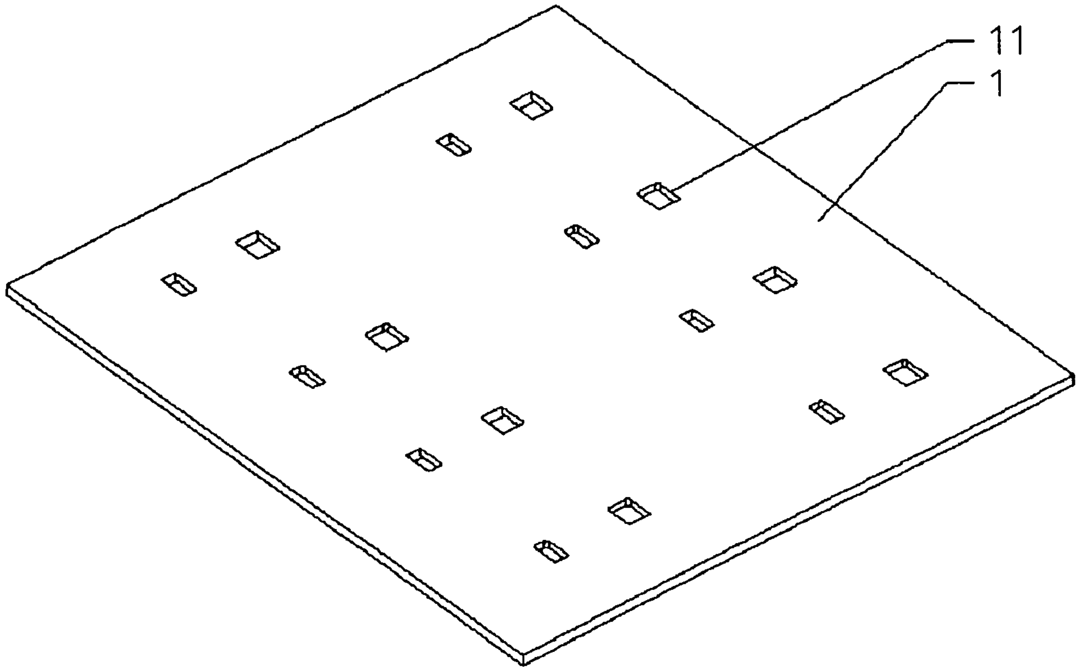
FIG. 4 is a perspective view of a keyboard base board according to the first embodiment of the present invention.

As shown in FIGS. 2 and 4, a method for coupling a keyboard base board with a keyboard base seat according to a first embodiment of the present invention comprises:

(a) a keyboard base board 1 being formed with a plurality of through holes 11;

(b) a mold 2 being formed with a keyboard base board space 21 and a keyboard base seat cavity 22 corresponding to a keyboard base seat 3;

(c) the keyboard base board 1 being placed on the mold 2, and the mold 2 being closed for injection molding;

(d) a plastic material being poured from a concave trough 221 through the through hole 11 into the keyboard base seat cavity 22, the through hole 11 of the keyboard base board 1 and the keyboard base seat cavity 22 being filled up with the plastic material;

(e) the mold 2 being opened to take out the keyboard base board 1 integrated with the keyboard base seat 3 after cooling.

Figure 3:
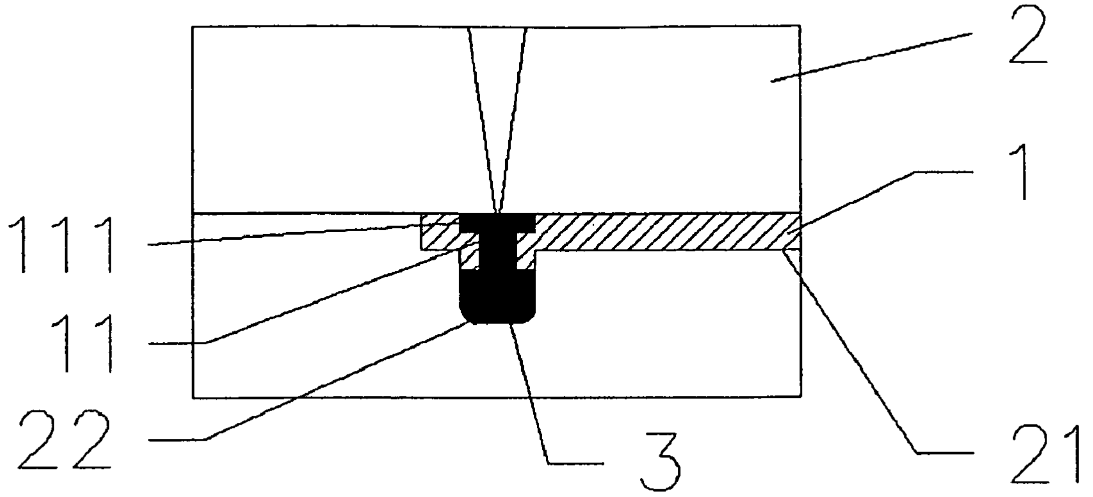
FIG. 3 is a schematic view of a mold according to a second embodiment of the present invention.
Figure 5:
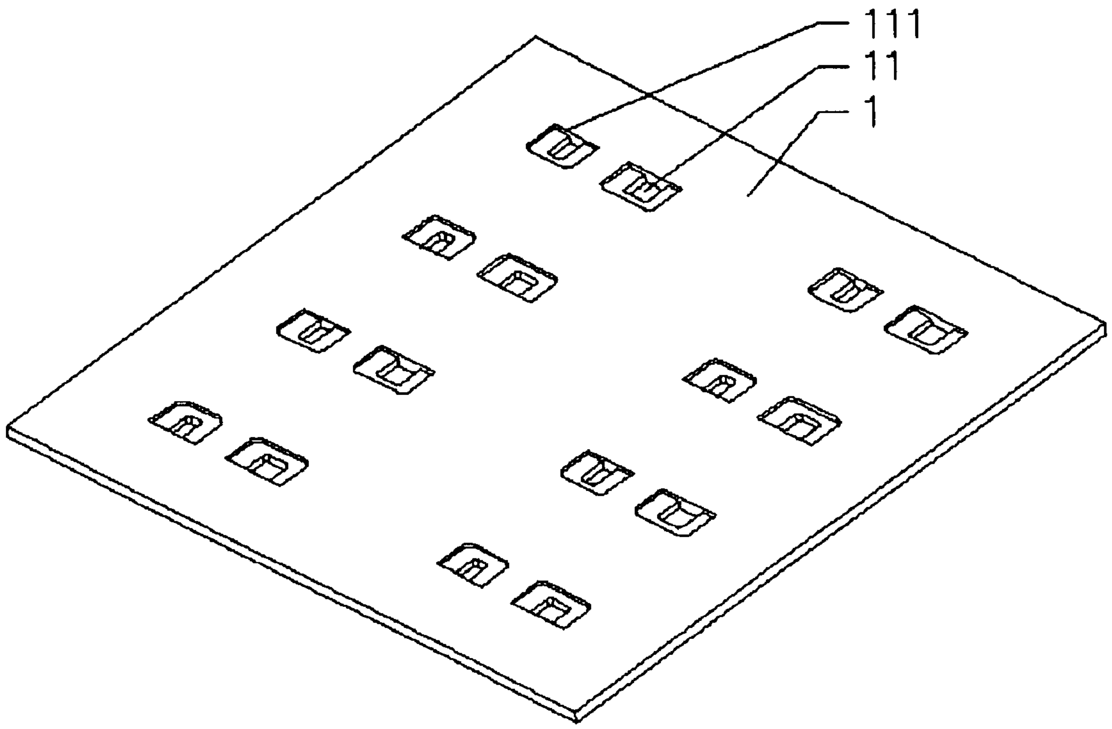
FIG. 5 is a perspective view of a keyboard base board according to the second embodiment of the present invention.
Figure 6:
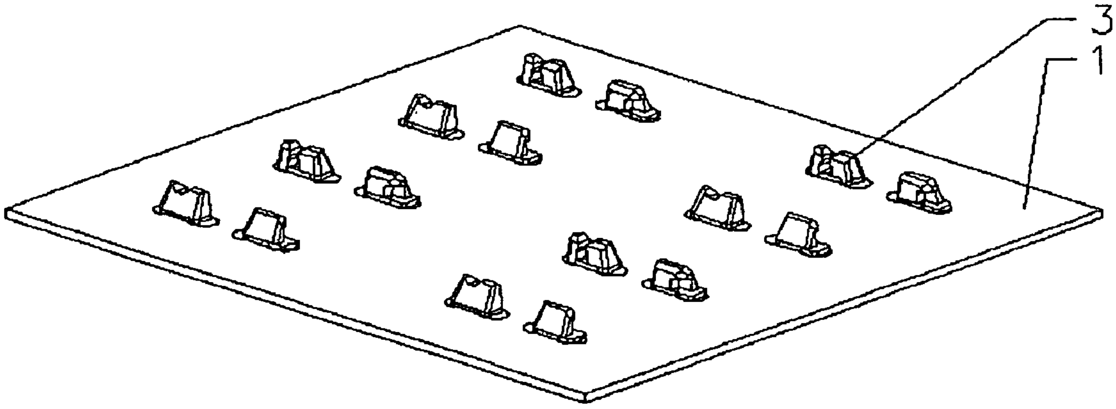
FIG. 6 is a perspective view showing the assembly of the keyboard base board and keyboard base seats of the present invention.

As shown in FIGS. 3 and 5, a method for coupling a keyboard base board with a keyboard base seat according to a second embodiment of the present invention comprises:

(a) a keyboard base board 1 being formed with a plurality of through holes 11 each having a stepped hole 111;

(b) a mold 2 being formed with a keyboard base board space 21 and a keyboard base seat cavity 22 corresponding to a keyboard base seat 3;

(c) the keyboard base board 1 being placed on the mold 2, and the mold 2 being closed for injection molding;

(d) a plastic material being poured through the through hole 11 into the keyboard base seat cavity 22, the through hole 11 and the stepped hole 111 of the keyboard base board 1 and the keyboard base seat cavity 22 being filled up with the plastic material; and (e) the mold 2 being opened to take out the keyboard base board 1 integrated with the keyboard base seat 3 after cooling.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A method for coupling a keyboard base board with a keyboard base seat, comprising: (a) a keyboard base board being formed with a plurality of through holes; (b) a mold being formed with a keyboard base board space and a keyboard base seat cavity corresponding to a keyboard base seat; (c) the keyboard base board being placed on the mold, and the mold being closed for injection molding; (d) a plastic material being poured from a concave trough through the through hole into the keyboard base seat cavity, the through hole of the keyboard base board and the keyboard base seat cavity being filled up with the plastic material, the plastic material flowing both above and below the keyboard base board; and (e) the mold being opened to take out the keyboard base board integrated with the keyboard base seat after cooling wherein the keyboard base seat is formed to extend to contact both an upper and a lower surface of the keyboard base board.

2. A method for coupling a keyboard base board with a keyboard base seat, comprising: (a) a keyboard base board being formed with a plurality of through holes each having a stepped hole; (b) a mold being formed with a keyboard base board space and a keyboard base seat cavity corresponding to a keyboard base seat; (c) the keyboard base board being placed on the mold, and the mold being closed for injection molding; (d) a plastic material being poured through the through hole into the keyboard base seat cavity, the through hole and the stepped hole of the keyboard base board and the keyboard base seat cavity being filled up with the plastic material; and (e) the mold being opened to take out the keyboard base board integrated with the keyboard base seat after cooling wherein the plurality of through holes are surrounded by a portion of the keyboard base board extending below a lower surface of the keyboard base board.

* * * * *